United States Patent [19]

Clark et al.

[11] 4,338,642

[45] Jul. 6, 1982

[54] DRIVE BELT RELEASE MECHANISM FOR MAGNETIC DISK DRIVES

[75] Inventors: Allen Clark; Michael V. Konshak, both of Colorado Springs, Colo.

[73] Assignee: Digital Equipment Corporation, Maynard, Mass.

[21] Appl. No.: 136,541

[22] Filed: Apr. 2, 1980

[51] Int. Cl.³ .................... G11B 17/00; G11B 5/012; G11B 25/04
[52] U.S. Cl. ...................... 360/97; 360/98; 474/119
[58] Field of Search .................. 360/97-98, 360/133, 135; 474/119, 126, 128-129

[56] References Cited

U.S. PATENT DOCUMENTS

| 2,474,457 | 6/1949 | Barth | 474/119 |
| 3,786,454 | 1/1974 | Lissner et al. | 360/106 |
| 3,839,920 | 10/1974 | Mulvany et al. | 474/119 |
| 4,054,931 | 10/1977 | Bolton et al. | 360/97 |
| 4,117,737 | 10/1978 | Mulholland et al. | 360/98 |

Primary Examiner—Alfred H. Eddleman
Attorney, Agent, or Firm—Cesari and McKenna

[57] ABSTRACT

A drive belt release mechanism for magnetic disk drives for disengaging a drive belt from and engaging a drive belt onto a spindle drive pulley. To disengage the belt, the mechanism lifts the belt from the drive pulley and simultaneously permits the drive motor to pivot to relieve the tension in the drive belt. To engage the belt, the mechanism seats the belt on the pulley and forces the motor to a drive position which yields the desired drive tension in the belt. The mechanism is completely mechanical and manually operable.

8 Claims, 5 Drawing Figures

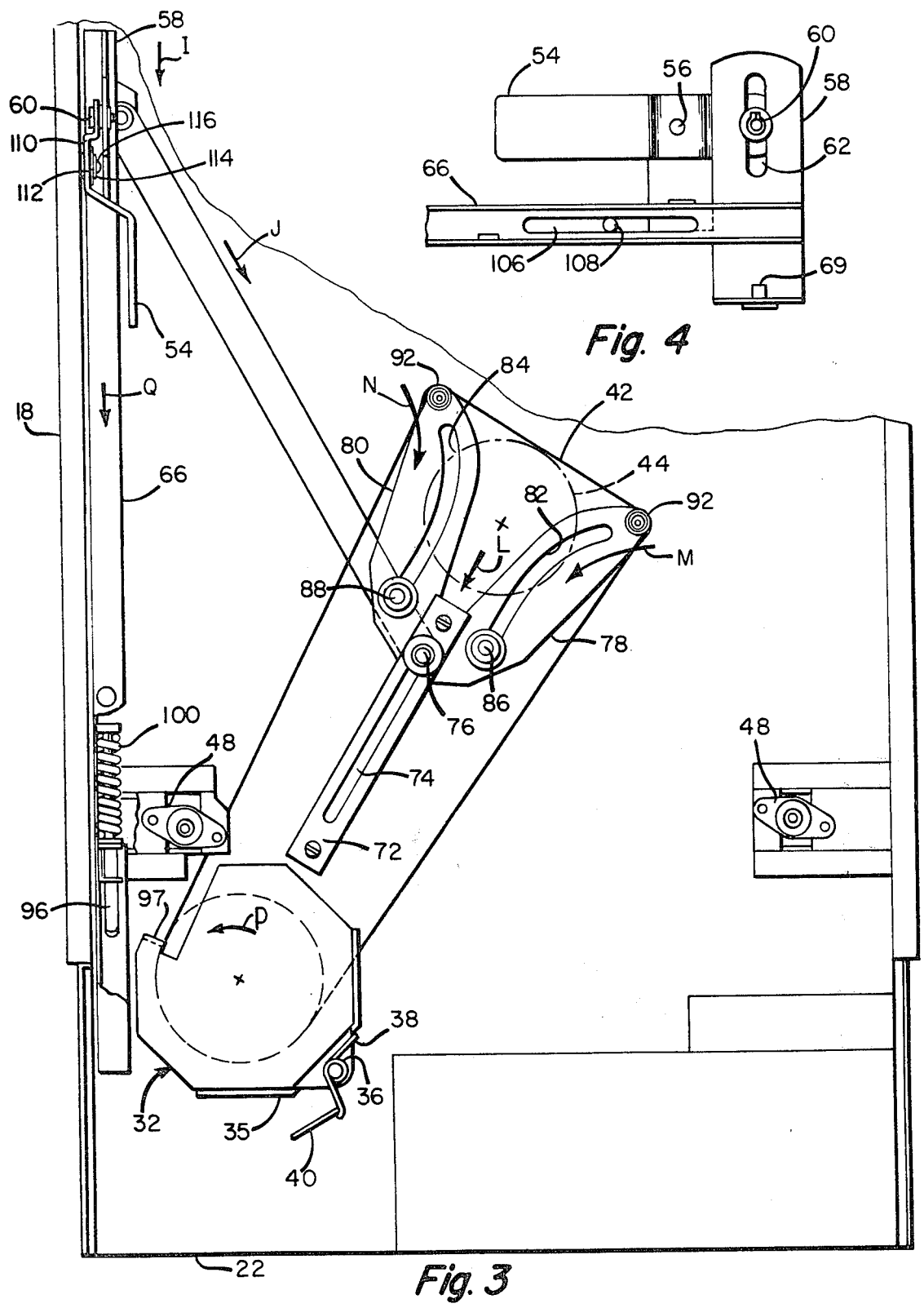

DRIVE BELT RELEASE MECHANISM FOR MAGNETIC DISK DRIVES

BACKGROUND OF THE INVENTION

1. Field of the Invention

This invention relates generally to the field of disk drives for data storage units used in data processing systems, and more particularly to a release mechanism for quickly and easily releasing the head and disk housing assembly thereof, to facilitate its insertion and removal.

2. Description of the Prior Art

Data processing systems typically include one or more mass data storage units in which data can be written on or retrieved from a magnetic medium. In modern data storage units, the magnetic medium typically may be deposited on and supported by an annular substrate such as aluminum. This disk is mounted in a drive in which it is rapidly rotated about its axis. The drive includes read/write heads which can be moved by an actuator in the drive across the disk surface to permit any one of a series of concentric annular data tracks to be accessed, the tracks being disposed on the substrate at differing radii. A drive may contain either a single disk or several disks stacked in spaced apart relation on a common spindle.

It has been an objective in recent years to increase the amount of data that can be stored on each disk, as well as the density at which the data is stored on the medium. This has necessitated an improvement not only in the magnetic medium itself, but also in the techniques used in manufacturing the drive, as rigid mechanical tolerances must be maintained to ensure that the read/write heads maintain the proper spacings over the disks. Furthermore, since the data is stored magnetically, the disk typically would attract dust from the surrounding air. If dust is permitted to accumulate on the disk surface, the accumulated dust would increase the height the read/write head must maintain above the disk, requiring the use of higher recording flux densities and reducing the available storage densities. The dust on the surface would also cause excessive wear on the head and slider.

To increase the reliability of the high-density mass storage disk, the so-called "Winchester"-type disk drives were developed in which the disks and the read/write heads and their actuating assemblies are all mounted in a housing assembly which is sealed to keep dust away from the disks. Filtered air may be directed over the annular disk surfaces to guard against the accumulation on the disks of dust which may seep into the housing. In prior art "Winchester"-type disk drives, as exemplified in U.S. Pat. No. 4,054,931 issued Oct. 18, 1977, the disk housing assembly comprises a heavy slab-like metal base plate and a separate cover, of lightweight material such as plastic, which completes and seals the housing. A gasket may be used between the base and the cover to enhance the sealing. The base plate is usually larger than the cover, but the cover extends over the portion of the base plate necessary to enclose the disks and the head actuator.

The disk housing assembly is mounted in the disk drive cabinet, which includes a drive motor for rotating the disks, typically through a belt which cooperates with a disk spindle pulley projecting through the bottom of the housing. The drive also typically includes power supplies for driving the motor and drive control logic circuitry to facilitate reading and writing the data from and onto the disks.

Heretofore, it has been cumbersome and time-consuming to remove the disks or the disk housing assembly from a "Winchester"-type disk drive. Such removal may be necessary when, for instance, the disk drive belt breaks or if a serious problem arises with the disks, heads, head, actuator or other elements of the drive. Several hours of service and "down" time may be required merely to remove and replace a disk housing assembly in prior art "Winchester" disk drives.

This invention provides a release mechanism whereby the complete disk housing assembly of a "Winchester" disk drive can be easily disengaged from and engaged to the drive in just a few minutes, substantially reducing the disk drive down time and the service expense.

SUMMARY OF THE INVENTION

It is therefore an object of the invention to provide a new and improved disk-type mass data storage unit for a data processing system.

It is a further object to provide a mechanism for quickly and easily releasing the disk pack and disk housing in a disk drive data storage unit.

It is a further object of the invention to provide a quick-release mechanism for use in a disk drive to reduce the down time and expense required in servicing a disk drive.

In brief, the invention provides a drive belt release mechanism for a "Winchester"-type disk drive in which the disks are housed in a sealed housing assembly and are driven through a spindle pulley and belt by a motor. The release mechanism includes an actuator and an arrangement for disengaging the belt from the spindle pulley in response to the actuator being actuated. The belt is kept in tension during disengagement from the spindle, to facilitate the subsequent replacement of the belt on the spindle pulley.

BRIEF DESCRIPTION OF THE DRAWINGS

For a more complete description of the invention, and the objects and advantages hereof, reference should be had to the following detailed description of an illustrative embodiment, taken in conjunction with the drawings in which:

FIG. 3 is a top plan view of the disk drive shown in FIG. 1 with the belt release mechanism in the actuated spindle released position;

FIG. 4 is a detail view of the release mechanism handle and bracket arm; and

DESCRIPTION OF AN ILLUSTRATIVE EMBODIMENT

Figure 1:
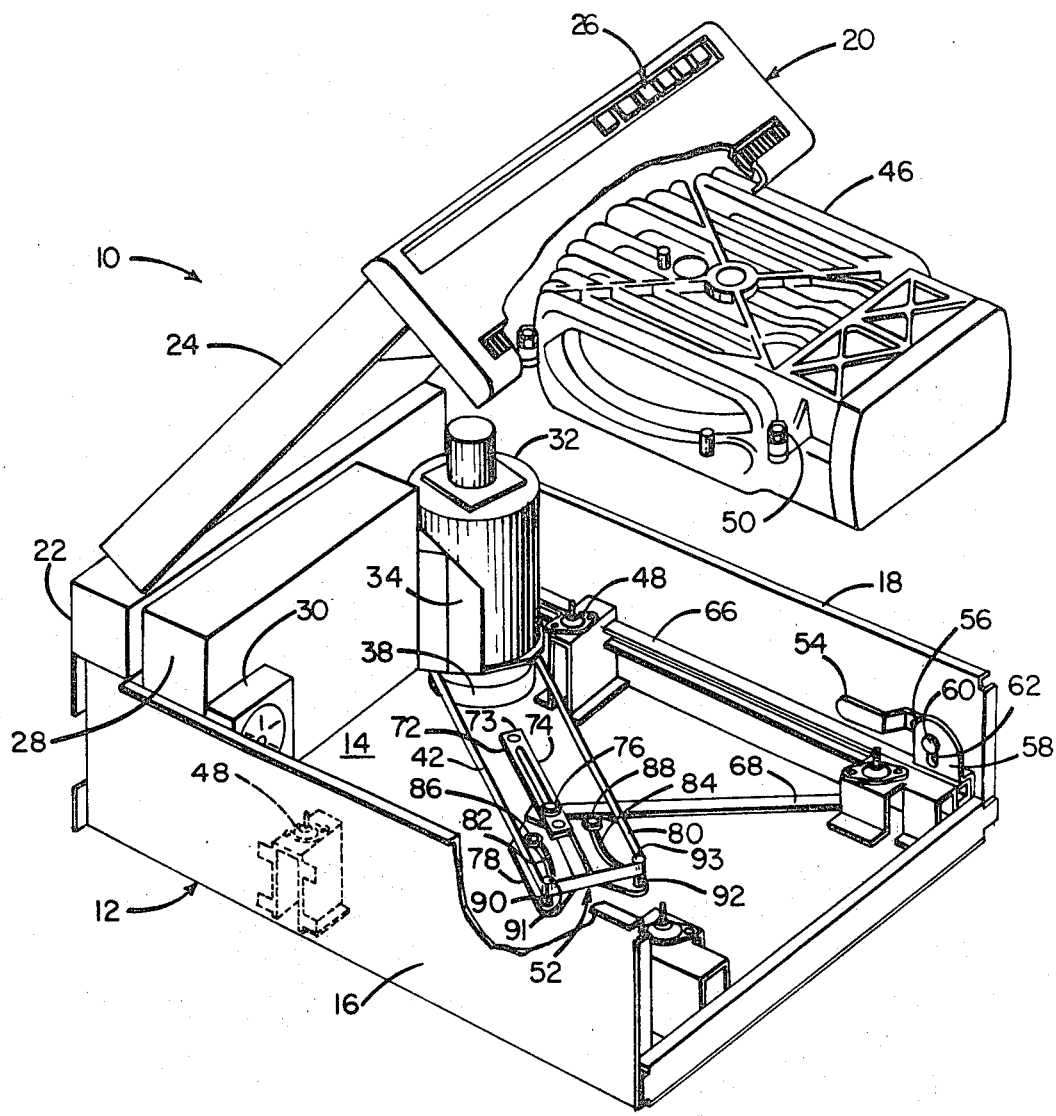
FIG. 1 is a perspective view of a disk drive including a release mechanism according to the invention and a disk housing usable in conjunction therewith.

FIG. 1 illustrates a disk drive 10 according to the invention including a housing 12 with a base 14, sides 16 and 18, front panel 20, rear panel 22 and top 24. The top is typically pivoted on hinges (not shown) at rear panel 22. Front panel 20 typically includes switches or indicator lights, generally indicated at 26, to control or indicate selected operations in the disk drive 10.

A disk drive 10 typically also includes several electrical and electronic circuits, some of which may be situated in housing 28 adjacent to the rear panel 22. The circuitry may include, for example, a power supply for powering the drive. Housing 28 may be provided with a cooling fan 30 to prevent the circuits from overheating.

Figure 2:
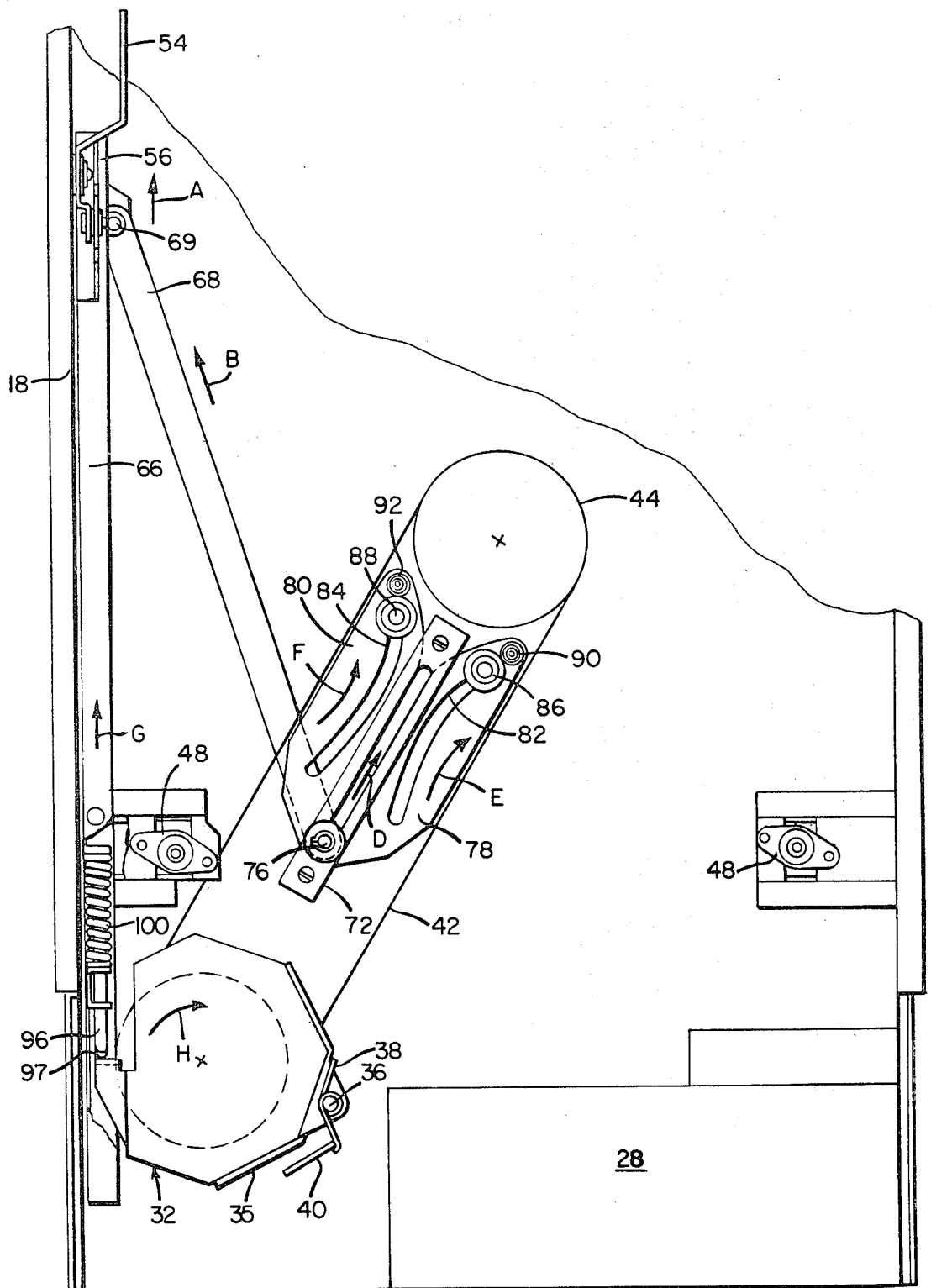
FIG. 2 is a top plan view of the disk drive as shown in FIG. 1, showing the belt release mechanism in the spindle engaged position.

Disc drive 10 also includes a conventional drive motor 32 having a drive pulley 34 attached to the lower end of the motor shaft proximate base plate 14. As can be seen from FIGS. 2 and 3, drive motor 32 is mounted on a bracket 35 which pivots about a shaft 36 mounted on and extending upwardly from base 14. A helical spring 38 is disposed coaxially about shaft 36 with one end abutting a stop 40 extending upwardly from base 14, and a second end abutting drive motor mount bracket 35. Spring 38 biases bracket 35, and with it motor 32, to pivot about shaft 36 counterclockwise, as shown in FIGS. 2 and 3, towards rear panel 22.

Disc drive 10 further includes a drive belt 42 that engages drive pulley 34 to drive a disk spindle pulley 44 that extends from the bottom of a disk housing assembly 46. (The disk housing assembly 46 is shown in FIG. 1, but is not shown in FIGS. 2 and 3 except for its spindle pulley 44.) The disk housing assembly includes one or more disks, which are rotatable on a spindle shaft driven by spindle pulley 44. The disk housing assembly, as is typical of "Winchester"-type disk drives, also includes the read/write heads and the actuating mechanism for moving the heads into position over the disks to facilitate reading and writing. The housing assembly 46 used with one specific embodiment of the invention is the subject of U.S. patent application Ser. No. 126,024, filed on Feb. 29, 1981 in the names of Charles Michael Riggle, Christopher A. Pollard, and John D. Read and entitled DISK HOUSING FOR DISK DRIVE MASS STORAGE UNIT, and assigned to the assignee of the present application. Release mechanisms according to the invention may, however, be used with housings other than housing assembly 46. The housing assembly 46 may also include some electronic circuitry, and also typically some circuitry may be provided on a printed circuit board which may be mounted on top of the housing when it is seated in the disk drive.

The disk housing assembly 46 sits in disk drive 10 on four shock isolators 48. Only the two rear shock isolators are shown in FIGS. 1-3. Two additional shock isolators, similar to shock isolators 48, are provided near front of housing 12. The housing assembly 46 is fastened onto shock isolators 48 by means of hexnuts 50.

In accordance with the invention, a belt release mechanism identified generally at 52 serves to disengage the belt 42 from spindle pulley 44 by lifting it off the spindle pulley when the mechanism 52 is in a belt-released condition as shown in FIGS. 1 and 3. The mechanism 52 also seats the belt onto the spindle pulley when in a belt-seated condition as shown in FIG. 2. The belt-released condition permits disk housing assembly 46 to be removed from the drive housing 10 merely by unlocking the hexnuts 50 from the shock isolators 48.

The release mechanism essentially includes two co-acting subassemblies: (1) a movable belt lift linkage, and (2) a belt-tension and motor-locking mechanism. When the release mechanism is actuated to go from the belt-seated condition to the belt-released condition, the movable linkage moves the portion of the belt that engages spindle pulley 44 forwardly in the cabinet to disengage it from the spindle pulley. Simultaneously, the belt-tension motor-locking mechanism releases the motor from its locked position (FIG. 2) to permit it to pivot about shaft 36 toward the front of housing 12, spring 38 maintaining nominal tension in belt 42. Conversely, when the release mechanism is deactuated, to go from the belt-released condition to the belt-seated condition, the linkage moves the belt rearwardly and releases it to engage spindle pulley 44. Simultaneously, the motor 32 is pivoted on bracket 35 rearwardly by spring 38 to maintain the belt in tension. The belt-tension and motor-locking mechanism then engages the motor bracket, biasing it rearwardly to establish the belt tension at the drive working condition.

Release mechanism 52 includes an actuating handle 54 pivotable about a pivot 56 fixed to the side 18 of drive housing 10. Handle 54 is shown in its release position in FIGS. 1 and 3. Handle 54 can be pivoted in the plane of sidewall 18, upwardly and forwardly from the position shown in FIG. 1 to change mechanism 52 to the belt-seated condition shown in FIG. 2. As shown in FIG. 4, handle 54 is connected to a bracket 58 through a pin 60 fixed to handle 54. Pivoting the handle 54 slides pin 60 vertically in a slot 62 in bracket 58, which translates bracket 58 horizontally along side wall 18.

A handle spring lock 61, also pivoted to pivot 56, pivots with handle 54. The lock has a free end that points upwardly when the handle is in the belt-seated position, and downwardly when the handle is in the belt-released position. The free end includes a slot 63 that receives a locking pin 65 projecting inwardly from sidewall 18 to lock handle 54 in the belt-seated position. The tip of the free end is beveled inwardly to constitute a tab, by which the lock can be lifted off the pin to permit handle 54 to pivot freely.

The lower end of bracket 58 is connected to a belt lift linkage 64. Bracket 58 is also connected to a motor belt tension rod 66.

The belt lift linkage includes a movable link 68 which has a first end pivotally connected by a pin 69 to bracket 58. The second end of link 68 in turn is pivotally connected to a pin 76. Belt lift linkage 64 also includes a guide member 72 fixed to housing 10 at pin 73 and including an elongated slot 74 directed generally forwardly from pin 73. A pin 76 is seated through slot 74 in guide member 72 and link 68, and is free to move with respect to the slot and housing 10.

Belt lift linkage 64 further includes two wing-like, mirror-image belt lift cam members 78 and 80, each of which has a rear end pivotally connected to pin 76. Each of wing members 78 and 80 is provided with an arcuate camming slot, 82 and 84 respectively. Pins 86 and 88 extend upwardly from a fixed location of base 14, through slots 82 and 84, respectively, for cooperation therewith to control the camming paths of the wing members. Upwardly extending pins 90 and 92 are mounted on the forward end of each of wings 78 and 80 respectively, for lifting the drive belt from the spindle pulley and retaining it when mechanism 52 is actuated. On each pin 90 and 92 there is provided a roller, 91 and 93, respectively, that can pivot in response to the belt rotating when the wings are in the belt-released condition.

Figure 5:
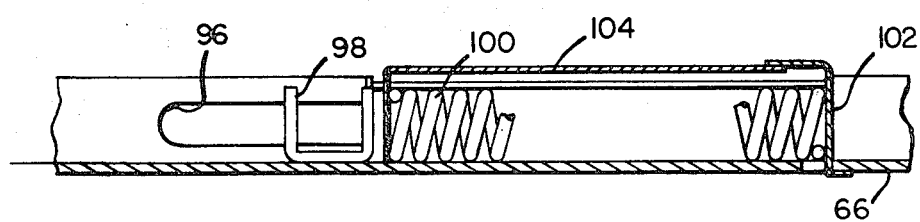
FIG. 5 is a detailed view of a portion of the release mechanism actuator arm.

The motor pivot belt tensioning mechanism includes rod 66 connected to bracket 58. Rod 66 is mounted against and longitudinally translatable along side wall 18. Toward the rear end thereof, rod 66 carries a springloaded, rearwardly-pointing finger 96, shown in detail in FIG. 5, which contacts a lip 97 on motor bracket 35 and biases the motor to pivot rearwardly. Finger 96 is mounted on a U-shaped bracket 98 slidable along rod 66 and which, in turn, is biased rearwardly by a spring 100 which abuts a stop 102 fixed to rod 66. A belt tension indicator 104 is provided to aid in adjusting belt tension and indicates when the belt has the required tension.

With reference to FIGS. 2 and 3, the operation of the release mechanism now will be described. FIG. 2 depicts the release mechanism in the belt-seated condition, with the wings 78 and 80 retracted to permit the belt 42 to be in frictional contact with spindle pulley 44. As indicated above, FIG. 2 shows the spindle pulley of the disk housing assembly but for clarity omits the remainder of the disk housing assembly. In the belt-seated condition, handle 54 points forwardly. To release the belt from spindle pulley 44, the free end of the handle is pivoted upwardly and rearwardly to the position shown in FIGS. 1 and 3. As handle 54 is so moved, the motion of pin 60 pulls bracket 58 forwardly (i.e., upwardly as shown in FIG. 2), in the direction of arrow A. The front end of link 68 is pulled forwardly therewith, in the direction indicated by arrow B in FIG. 2. This motion forces the rearward end of link 68, carrying pin 76, to move forwardly in slot 74 in the direction of arrow D. Moving pin 76 forward also pushes the rear ends of wing members 78 and 80 forwardly. The motion of wings 78 and 80 is guided by pins 86 and 88 in the arcuate slots 82 and 84. The camming action thus provided forces the wing members (and, in particular, pins 90 and 92) to move both forwardly (towards the top of FIG. 2) and outwardly away from each other, in the directions indicated by arrows E and F, respectively.

Simultaneously, the forward motion of bracket 58 pulls rod 66 forwardly, in the direction shown by arrow G. This releases the spring pressure on finger 96 which had been biasing motor 32, through lip 97 towards the rear. Spring 38 provides a counterclockwise biasing force (as shown in FIG. 2) which continues to maintain tension on the belt 42 in the released condition. With the handle moved all the way in the belt-released direction, the release mechansim 62 assumes the condition shown in FIG. 3. At this point, the belt is disengaged from spindle 44 and the disk housing assembly 46 can be removed by simply unfastening the nuts 50 from shock isolators 48 and lifting the disk housing assembly out of the cabinet.

To install or re-install disk housing assembly 46, the belt release mechanism is first placed in the belt-released condition shown in FIGS. 1 and 3. The disk housing assembly 46 is then seated on shock isolators 48 and the wingnuts are tightened. The free end of handle 54 is moved upwardly and forwardly from the FIG. 3 position toward the FIG. 2 position. This urges bracket 58 rearwardly as indicated by arrow I. Correspondingly, link 68 is urged rearwardly, as represented by arrow J. Pin 76 in turn is urged to move rearwardly in slot 74, according to arrow L, which motion in turn causes wings 78 and 80 to retract and the slots 82 and 84 cooperating with pins 86 and 88 to move the wings together and rearwardly in the directions shown by arrows M and N, respectively. Pins 90 and 92 are moved simultaneously towards each other and rearwardly, seating the belt about the spindle pulley. As the belt engages the spindle, spring 38 urges motor 32 to pivot counterclockwise in the direction represented by arrow P.

Continued motion of bracket 58 then forces rod 66 to move rearwardly, according to arrow Q. Finger 96 engages the lip 97 on the pivoting motor bracket 35 and forces the bracket (and, thus, the motor) into its drive position with the desired belt tension.

Rod 66 is preferably a channel-shaped member having its open side facing horizontally towards the interior of the disk drive. The vertical web is preferably adjacent to side wall 18, and may include a plurality of guide slots, one of which is shown at 106, which can accommodate guide pins 108 extending from side wall 18. Shock isolator 48 adjacent side wall 18 preferably includes slots to accommodate and guide rod 66. Handle 54 is mounted on side wall 18 by means of a pair of bushings 110 and 112, a washer 114 and a threaded fastener 116.

As shown in FIG. 2, pins 90 and 92 are preferably completely disengaged from belt 42 when the release mechanism is in the seated condition.

Belt tension indicator 104 may be provided with a tension indicating scale for indicating the amount of compression in spring 100 and thereby indicating the tension in belt 42. Also, means may be provided for adjusting belt tension by, for example, movement of lip 97 with respect to bracket 35.

It may thus be seen that the objects recited above, in addition to those made apparent from the preceding specification, have been efficiently attained. The invention provides a new and improved mechanism arrangement for releasing a belt in a disk drive to facilitate the removal of a disk housing assembly therefrom, and to further facilitate the installation of the disk housing assembly in the drive. Since certain changes may be made in the above illustrative embodiments without departing from the scope of the claims, it is intended that all matter named in the above description and shown in the accompanying drawings be interpreted as illustrative and not in a limiting sense.

What is claimed as new and desired to be secured by Letters Patent of the United States is:

1. In a disk drive in which a rotatable disk is housed in a disk housing assembly having a drive spindle pulley projecting therefrom, the disk drive including a drive motor and a drive belt, the drive belt engaging the drive motor and the spindle pulley to facilitate the rotation of the disk by the motor, a release mechanism comprising:
   actuator means movable by an operator between a belt-released position and a belt-seated position, and
   means responsive to the movement of the actuator means for disengaging the belt from the spindle pulley when the actuator means is in the belt-released position and for engaging the belt on the spindle pulley when the actuator means is in the belt-seated position, said means comprising first and second belt-engaging members engaging said actuator means and a camming means so that, when said actuator means is moved between the belt-released position and the belt-seated position, said first and second members are moved along paths defined by said camming means on opposing sides of the spindle pulley to wholly disengage and engage the belt from the spindle pulley.

2. A release mechanism as defined in claim 1 in which each of said belt-engaging members includes a pin for engaging and retaining said belt.

3. A release mechanism as defined in claim 2 wherein each of the belt-engaging members includes means defining a camming slot, said camming means including a camming guide pin fixed to the disk drive for engaging each slot, each of said belt-engaging members moving in a path defined by the co-action of the guide pins in the respective slots in response to the actuator means being moved between the belt-released position and the belt-seated position.

4. A release mechanism as defined in claim 3 in which each of said slots is arcuate so that the pins of the belt-engaging members move apart as the actuator is moved from the belt-seated position to the belt-released position.

5. A release mechanism as defined in claim 4 in which the means for disengaging and engaging further includes a link having an end engaging said actuator means and movable between a belt-released position and a belt-seated position in response to said actuator means being moved between a belt-released position and a belt-seated position, a guide member fixed to the disk drive having a guide slot therein, a pin guidingly engaging said guide slot and pivotally engaging said belt-engaging members, said pin also engaging the second end of said link and being movable in said guide slot in response to the movement of said link, whereby movement of said actuator means moves said link, which urges said pin to move along said guide slot, which motion in turn moves said belt engaging members to engage and disengage the belt from the spindle pulley.

6. A release mechanism as defined in claim 1 wherein said motor is mounted to pivot in the disk drive, and further including means responsive to movement of the actuator means for urging said motor to pivot to maintain the belt at a selected tension when the actuator means is in the belt-seated position.

7. A release mechanism as defined in claim 6 wherein said urging means includes a movable finger engageable with said motor, and means for moving said finger to engage the motor when the actuator means is in the belt-seated position, and to disengage said motor when the actuator means is in the belt-released position.

8. A release mechanism as defined in claim 7 wherein said urging means includes resilient means for biasing said finger against said motor when said finger is engaged with said motor.

* * * * *